United States Patent
Miklós et al.

(10) Patent No.: US 8,761,805 B2
(45) Date of Patent: Jun. 24, 2014

(54) AVOIDING EXCESSIVE SIGNALING DURING WIRELESS TERMINAL TOGGLING

(75) Inventors: György Miklós, Pillsborosjenö (HU); Roland Gustafsson, Myggenäs (SE); Gunnar Mildh, Sollentuna (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 450 days.

(21) Appl. No.: 12/922,932

(22) PCT Filed: Mar. 24, 2009

(86) PCT No.: PCT/SE2009/050307
§ 371 (c)(1),
(2), (4) Date: Jan. 10, 2011

(87) PCT Pub. No.: WO2009/120138
PCT Pub. Date: Oct. 1, 2009

(65) Prior Publication Data
US 2011/0105153 A1    May 5, 2011

Related U.S. Application Data

(60) Provisional application No. 61/039,480, filed on Mar. 26, 2008.

(51) Int. Cl.
*H04W 24/00* (2009.01)
*H04W 4/00* (2009.01)

(52) U.S. Cl.
USPC .............. 455/456.5; 455/432.1; 455/433; 455/435.1; 455/456.1

(58) Field of Classification Search
CPC ... H04W 36/24; H04W 36/32; H04W 36/245; H04W 48/18; H04W 60/04; H04W 24/00; H04W 24/02; H04W 24/04; H04W 8/02; H04W 8/04; H04W 60/00; H04W 60/02; H04W 4/00; H04W 4/28; H04M 1/00
USPC ............... 455/401.2, 418–420, 432.1–432.3, 455/433–434, 435.1–435.3, 436–444, 455/456.1–456.6, 457, 524–525, 560–561, 455/550.1, 552.1, 556.2; 370/310, 313, 370/328, 338, 395.5, 395.52
See application file for complete search history.

(56) References Cited

U.S. PATENT DOCUMENTS 5,956,637 A * 9/1999 Ericsson et al. ........... 455/432.3
6,341,220 B1 * 1/2002 Hurme .......................... 455/410
(Continued)

FOREIGN PATENT DOCUMENTS

CN    1370021 A    9/2002
CN    1396779 A    2/2003
(Continued)

OTHER PUBLICATIONS

Patel, S., "Location, identify and wireless fraud detection" Personal Wireless Communications, (Dec. 17, 1997), pp. 515-521.
(Continued)

*Primary Examiner* — Meless Zewdu
(74) *Attorney, Agent, or Firm* — Nixon & Vanderhye P.C.

(57) ABSTRACT

A core network node maintains history information configured to provide a log of location information, and uses the history information to determine whether a wireless terminal is in a location update toggling scenario. The history information can also be used to curtail the toggling scenario. One example mode comprises using the history information to determine whether the wireless terminal is toggling between plural radio access networks of differing radio access technologies. Another example mode comprises using the history information to determine whether the wireless terminal is toggling between a first area update location and a second area update location. Yet another example mode comprises using the history information to determine whether the wireless terminal is toggling between a first core network node and a second core network node.

34 Claims, 11 Drawing Sheets

(56) References Cited

U.S. PATENT DOCUMENTS

| | | | |
|---|---|---|---|
| 7,136,636 B1* | 11/2006 | McLaughlin | 455/423 |
| 7,139,570 B2* | 11/2006 | Elkarat et al. | 455/432.3 |
| 7,333,808 B2* | 2/2008 | Elkarat et al. | 455/432.1 |
| 7,363,041 B2* | 4/2008 | Bonnard et al. | 455/456.1 |
| 7,920,846 B2 | 4/2011 | Wang | 455/411 |
| 8,068,846 B2* | 11/2011 | Casati et al. | 455/456.1 |
| 2002/0197991 A1* | 12/2002 | Anvekar et al. | 455/432 |
| 2003/0027574 A1 | 2/2003 | Watanabe et al. | |
| 2004/0259567 A1* | 12/2004 | Valko et al. | 455/456.1 |
| 2006/0135174 A1* | 6/2006 | Kraufvelin et al. | 455/456.1 |
| 2008/0049741 A1* | 2/2008 | Wirtanen et al. | 370/389 |
| 2008/0070550 A1* | 3/2008 | Hose | 455/411 |

FOREIGN PATENT DOCUMENTS

| | | |
|---|---|---|
| EP | 1 229 754 A1 | 8/2002 |
| EP | 1 276 342 | 1/2003 |
| EP | 1 276 342 A1 | 1/2003 |

OTHER PUBLICATIONS

NEC: "ping pong detection in idle mode", 3GPP Draft; R3-080385 Ping Pong Detection_Idle_Mode, 3rd Generation Partnership Project (3GPP), Mobile Competence Contre, vol. RAN WG3, (Feb. 5, 2008), p. 1 paragraph 1-p. 2, paragraph 2.1.

Cho, D-H et al., "Group Location Management for Mobile Subscribers on Transportation Systems in Mobile Communication Networks", IEEE Transactions on Vehicular Technology, vol. 53, No. 1, (Jan. 1, 2004), pp. 181-191.

International Search Report for PCT/SE2009/050307, mailed Jul. 24, 2009.

English translation of Chinese Official Action, Oct. 31, 2012, in Chinese Application No. 200980112381.

Translation of Chinese Search Report, Oct. 31, 2012, in Chinese Application No. 200980112381.

* cited by examiner

| HISTORY LIST (LOG) |||
|---|---|---|
| ENTRY/ SEQUENCE NO | SITE TYPE | TIME SPENT |
|  |  |  |
|  |  |  |
|  |  |  |
|  |  |  |
| ... | ... | ... |
|  |  |  |

| ENTRY/<br>SEQUENCE NO | RAT<br>TYPE | TIME<br>SPENT | NODE | UE<br>LOC AREA | CORE<br>NETWORK<br>NODE |
|---|---|---|---|---|---|
| | | | | | |
| | | | | | |
| | | | | | |
| ... | | | | | |
| | | | | | |

HISTORY LIST

*Fig. 11*

AVOIDING EXCESSIVE SIGNALING DURING WIRELESS TERMINAL TOGGLING

This application is the U.S. national phase of International Application No. PCT/SE2009/050307, filed 24 Mar. 2009, which designated the U.S. and claims the benefit of U.S. Provisional No. 61/039,480, filed 26 Mar. 2008, the entire contents of each of which are hereby incorporated by reference.

BACKGROUND

This invention pertains to wireless telecommunications, and particularly to managing signaling when a wireless terminal is in a toggling or potential toggling scenario.

In a typical cellular radio system, wireless terminals (also known as mobile stations and/or user equipment units (UEs)) communicate via a radio access network (RAN) to one or more core networks. The wireless terminals can be mobile stations or user equipment units (UE) such as mobile telephones ("cellular" telephones) and laptops with wireless capability (e.g., mobile termination), and thus can be, for example, portable, pocket, hand-held, computer-included, or car-mounted mobile devices which communicate voice and/or data with radio access network.

The radio access network (RAN) covers a geographical area which is divided into cell areas, with each cell area being served by a base station, e.g., a radio base station (RBS), which in some networks is also called "NodeB" or "B node". A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units (UE) within range of the base stations.

In some versions of the radio access network, several base stations are typically connected (e.g., by landlines or microwave) to a controller node, such as a base station controller (BSC) or radio network controller (RNC). The controller supervises and coordinates various activities of the plural base stations connected thereto. The controller nodes are typically connected to one or more core networks.

Different radio access networks (RAN) can have differing radio access technologies (RATs). One type of radio access technology (RAT) known as UTRAN is used by the Universal Mobile Telecommunications System (UMTS), a third generation mobile communication system which evolved from the Global System for Mobile Communications (GSM). UTRAN is a radio access network using wideband code division multiple access for user equipment units (UEs).

Another radio access technology (RAT) is known as GERAN, which is an abbreviation for GSM EDGE Radio Access Network. GERAN is a digital mobile phone technology that allows improved data transmission rates as an extension on top of standard GSM. GERAN is a part of GSM, and also of combined UMTS/GSM networks.

In a forum known as the Third Generation Partnership Project (3GPP), telecommunications suppliers propose and agree upon standards for third generation networks, such as UTRAN and GERAN, and investigate enhanced data rate and radio capacity. The Third Generation Partnership Project (3GPP) has undertaken to evolve further the UTRAN and GSM based radio access network technologies, resulting in yet further radio access technologies.

One of the further radio access technologies is the Evolved Universal Terrestrial Radio Access Network (EUTRAN). Another name for EUTRAN, is the Long Term Evolution (LTE) RAN. The core network where EUTRAN is connected to is called Evolved Packet Core (EPC), a.k.a. System Architecture Evolution (SAE) network. Both the EUTRAN and the EPC comprise together the Evolved Packet System (EPS) that is also known as the SAE/LTE network. A base station in this concept is called EUTRAN NodeB (eNodeB or eNB). In EUTRAN, the radio base station nodes (eNodeBs) are connected directly to a core network rather than to radio network controller (RNC) nodes, and the functions of a radio network controller (RNC) node are performed by the radio base stations nodes (eNodeBs). As such, the radio access network (RAN) of an EUTRAN/LTE system has an essentially "flat" architecture (comprising radio base station nodes without reporting to radio network controller (RNC) nodes). The evolved UTRAN thus comprises evolved base station nodes, e.g., evolved NodeBs or eNBs, providing evolved UTRA user-plane and control-plane protocol terminations toward the user equipment unit (UE). Moreover, in EUTRAN, the resources of communication systems, such as the frequency allocation and bandwidth are shared among multiple users simultaneously.

In many radio access technologies a wireless terminal, such as a user equipment unit (UE), can make transitions through several specified states, including a state known as Idle Mode and a state known as connected Mode. In Idle Mode the user equipment unit (UE) does not need to transmit or receive data, but can continue to scan the radio access network to keep track of its location and can receive pages. Also in Idle Mode the user equipment unit (UE) reports its location by sending updates to the network (such as Location Area Updates or Routing Area Updates in UTRAN, for example). When in the Idle Mode the user equipment unit (UE) is identified by identifiers such as the International Mobile Subscriber Identity (IMSI) and/or the Temporary Mobile Subscriber Identity (TMSI).

When a user equipment unit (UE) receives a confirmation about the establishment of a radio resource control (RRC) connection from the network, the user equipment unit (UE) goes into the connected mode. In the UTRAN-connected mode the user equipment unit (UE) is assigned a Radio Network Temporary Identity (RNTI).

As the user equipment unit (UE) can be mobile, the user equipment unit (UE) may wander or migrate from an area served by a radio access network (RAN) of a first type of radio access technology (RAT) to an area served by a network of another type of radio access technology (RAT). If the user equipment unit (UE) is capable of participating in communications with both types of radio access technologies (e.g., is a dual mode UE), and depending on various conditions, the user equipment unit (UE) may be handed over from the first radio access technology to the second radio access technology. In so doing, the user equipment unit (UE) can undergo an inter-RAT handover or participate in an inter-RAT cell reselection procedure.

At an access change to a new radio access technology (RAT), the user equipment unit (UE) typically engages in an area update procedure, e.g., a routing area update (RAU) in GERAN/UTRAN or a tracking area update (TAU) in EUTRAN. A tracking area comprises a cluster of eNodeBs (base station nodes) in the EUTRAN network. Each area update procedure involves signaling. For example, area update procedure signaling occurs when a user equipment unit (UE) transitions from a EUTRAN network to a GERAN/UTRAN network or vice versa.

On some occasions a user equipment unit (UE) may be situated or operated so as to experience repeated transitions back and forth between two radio access technologies. For example, as the user equipment unit (UE) travels it may "toggle" between the EUTRAN network and the GERAN/UTRAN network. Each toggle can potentially involve or invoke the signaling required for the area update procedure (e.g., RAU/TAU).

A concept known as Idle State Signalling Reduction (ISR) has been developed as an attempt to mitigate the amount of area update procedure signaling that could otherwise occur during toggling. In particular, the Idle State Signalling Reduction (ISR) is intended to reduce the frequency of TAU and RAU procedures caused by UEs reselecting cells between E-UTRAN and GERAN/UTRAN networks which are operated together. The Idle State Signalling Reduction (ISR) thus attempts to reduce the area update procedure signaling between the user equipment unit (UE) and the network, as well as the network internal signaling.

When the ISR feature is activated the user equipment unit (UE) is registered with nodes or entities which comprise or connect the respective radio access technologies with their core networks. That is, when the Idle State Signalling Reduction (ISR) feature is activates the user equipment unit (UE) is registered both with a core network node known as the Serving GPRS Support Node (SGSN) for the UTRAN and GERAN, and a core network node known as the Mobility Management Entity (MME) for the EUTRAN. The ISR feature is described, e.g., in 3GPP TS 23.401 V8.4.1. (2008-12), $3^{rd}$ Generation Partnership Project; Technical Specification Group Services and System Aspects; General Packet Radio Service (GPRS) Enhancements for Evolved Universal Terrestrial Radio Access Network (E-UTRAN) Access (release 8), which is incorporated herein by reference in its entirety.

The Serving GPRS Support Node (SGSN) (for UTRAN and GERAN) is a signalling and in certain cases user plane entity serving the mobile stations within its geographical service area. Its tasks include mobility management (attach/detach and location management), logical link management, and authentication and charging functions, and for GERAN and optionally for UTRAN packet routing and transfer functions. The location register of the SGSN stores location information (e.g., current cell, current VLR) and user profiles (e.g., IMSI, address(es) used in the packet data network) of all GPRS users registered with this SGSN.

The Mobility Management Entity (MME) is a signaling entity in the core network (e.g., a core network node in some networks) for the EUTRAN. The main function of the MME is to manage the mobility of the user equipment unit (UE). As such, the MME is responsible for idle mode UE tracking and paging procedures including retransmissions. The MME is also responsible for authenticating the user.

When a UE attaches to a Mobility Management Entity (MME), it is allocated an identity, i.e. a GUTI (Globally Unique Temporary Identity). A GUTI consists of two parts, one part that identifies the MME which allocated the GUTI and which holds the UE context, and one part which identifies the UE within the MME. The part that identifies the MME is a Globally Unique MME Identity (GUMMEI), which in turn consists of a Public Land Mobile Network PLMN ID (i.e. MCC+MNC) [Mobile Country Code+Mobile Network code], an MME group identity (MMEGI) which identifies the MME pool and an MME code (MMEC) which identifies the MME within the pool. The part of the GUTI that identifies the UE within the MME is called M-TMSI (M-Temporary Mobile Subscriber Identity). The combination of MMEC and M-TMSI is denoted S-TMSI. The S-TMSI is used for identification of the UE in situations where the PLMN ID and MMEGI are known.

The Idle State Signalling Reduction (ISR) feature has thus been proposed to limit mobility related signaling during an inter-RAT cell reselection in idle state (ECM-IDLE state in E-UTRAN, PMM-IDLE state in UTRAN, GPRS STANDBY state in GERAN)). As mentioned above, with Idle State Signalling Reduction (ISR) the user equipment unit (UE) is registered in both the GERAN/UTRAN network and the EUTRAN network simultaneously, and does not perform an area update procedure (TAU/RAU) at access change once registered at both the SGSN and at the Mobility Management Entity (MME). When downlink data arrives to the user equipment unit (UE) in Idle Mode, paging is performed in both the GERAN/UTRAN network and the EUTRAN network. While the Idling State Signalling Reduction (ISR) feature is a very generic way of solving the toggling problem, Idle State Signalling Reduction (ISR) introduces significant additional complexity.

SUMMARY

In one of its aspects the technology disclosed herein concerns a core network node of a communications and method of operating such node. The method comprises maintaining, in the core network node, history information configured to provide a log of location information, and then using the history information to determine whether the wireless terminal is in a location update toggling scenario, e.g., a toggling scenario between different sites which causes location update procedures to be performed too often. As an optional additional aspect, the method can further comprise using the history information to curtail the toggling scenario.

There are several ways of using the history information to determine whether the wireless terminal is in a toggling scenario. In some modes the history information is used to determine whether the wireless terminal is toggling between two different sites (e.g., between a first radio access technology network and a second radio access technology network, for example). Another example mode comprises using the history information to determine whether the wireless terminal has transitioned through more than a threshold number of sites (e.g., transitioned through more than a threshold number of networks of differing radio access technologies).

Different modes comprise using the history information to determine whether the wireless terminal is in differing toggling scenarios. One example mode comprises using the history information to determine whether the wireless terminal is toggling between plural radio access networks of differing radio access technologies. Another example mode comprises using the history information to determine whether the wireless terminal is toggling between a first area update location and a second area update location. Yet another example mode comprises using the history information to determine whether the wireless terminal is toggling between a first core network node and a second core network node.

An example mode of the method further comprises maintaining the history information in a UE context for the wireless terminal. In an example implementation, the history information serves as a log of sites visited by a wireless terminal, and thus a log of requested location updates. Maintaining the history information comprises configuring the history information to comprise an integer N number of records, each record comprising plural fields, and wherein record j includes a site identifier field and a time field, the site identifier field indicating a site involved in area update j and wherein the time field is configured to facilitate a determination of an amount of time the wireless terminal has spent in the site identified for the record j.

The log can also have further fields. For example, in separate or potentially combined implementations, the method can further comprise including in a record j an area location field which identifies an area update identifier utilized by the wireless terminal in the site (e.g., radio access technology network) of record j. Alternatively or additionally, the method can further comprise including in a record j a UE node field which identifies a core network node involved in the area update of record j.

As mentioned above, the method can also comprise using the history information to curtail the toggling scenario. The curtailing can occur in various ways.

In one example mode curtailing the toggling comprises reconfiguring a parameter utilized by the wireless terminal in selecting a radio access technology. One example implementation of this mode further comprises sending a new or reconfigured parameter to the radio access network (RAN) node, and then the radio access network (RAN) node providing the new or updated parameters to the wireless terminal when the wireless terminal transitions from connected mode to idle mode. Another example implementation of this mode further comprises signaling an updated priority list of radio access technologies to the wireless terminal to be used for RAT selection. This can be by utilizing the RAT priority lists and parameters as defined in TS 36.304, incorporated herein by reference.

Another example implementation of this toggle curtailment mode further comprises temporarily reconfiguring the parameter utilized by the wireless terminal in selecting a radio access technology; and then returning the parameter to an original value. The parameter can be returned to its original value in several ways. One example implementation comprises returning the parameter to an original value upon expiration of a network node timer. Another implementation comprises returning the parameter to an original value upon expiration of a timer maintained by the wireless terminal. Another implementation comprises returning the parameter to an original value when the wireless terminal has moved away from areas involved in the toggling. Another implementation comprises returning the parameter to an original value when the wireless terminal enters connected mode.

Another example mode of curtailing the toggling comprises paging the wireless terminal and bringing the wireless terminal to a connected mode.

Another example mode of curtailing the toggling comprises rejecting an area update attempt by the wireless terminal.

In another of its aspects the technology disclosed herein comprises a core network node of a communications network. The node can be or comprise, for example, a node of a core network, such as a Mobility Management Entity (MME) or a SGSN. The node is configured to use the history information to determine whether the wireless terminal is in a toggling scenario wherein location update procedures are performed too often.

In an example embodiment, the node comprises a memory and a detector. The memory is configured to store history information comprising a log of area updates requested for a wireless terminal. The detector is configured to use the history information to determine whether the wireless terminal is in the toggling scenario. As an optional additional aspect, the node can further be configured (e.g., with a toggle inhibitor) to use the history information to curtail the toggling scenario.

The node can be configured to determine several types of wireless terminal toggling scenarios. In some embodiments the node is configured to use the history information to determine whether the wireless terminal is in a toggling scenario between two different sites. For example, in one example embodiment the node is configured to use the history information to determine whether the wireless terminal is toggling between a first radio access technology network and a second radio access technology network. In another example embodiment the node is configured to use the history information to determine whether the wireless terminal has transitioned through more than a threshold number of sites (e.g., whether the wireless terminal has transitioned through more than a threshold number of networks of differing radio access technologies).

In other embodiments the node is configured to use the history information to determine whether the wireless terminal is in other toggling scenarios. In one example embodiment the node is configured to use the history information to determine whether the wireless terminal is toggling between plural radio access networks of differing radio access technologies. In another example embodiment the node is configured to use the history information to determine whether the wireless terminal is toggling between a first area update location and a second area update location. In yet another example embodiment the node is configured to use the history information to determine whether the wireless terminal is toggling between a first core network node and a second core network node.

In an example embodiment, the memory is configured to maintain the history information in a UE context for the wireless terminal. In an example implementation, the history information serves as a log of sites visited by a wireless terminal. The history information comprises an integer N number of records, each record comprising plural fields, and wherein record j includes a site identifier field and a time field, the site identifier field indicating a site involved in area update j and wherein the time field is configured to facilitate a determination of an amount of time the wireless terminal has spent in the site identified for record j.

The log can also have further fields. For example, in separate or potentially combined implementations, the method can further comprise including in a record j an area location field which identifies an area update identifier utilized by the wireless terminal in the site (e.g., radio access technology network) of record j. Alternatively or additionally, the method can further comprise including in a record j a UE node field which identifies a core network node involved in the area update of record j.

As indicated above, in some embodiments the node can be configured (e.g., with a toggle inhibitor) to use the history information to curtail the toggling between the plural sites. The toggle inhibitor can be configured to curtail the toggling in various ways.

In some example embodiments the toggle inhibitor is configured to curtail the toggling by reconfiguring a parameter utilized by the wireless terminal in selecting a radio access technology. In one example such implementation the toggle inhibitor is configured to curtail the toggling by sending a new or reconfigured parameter to the radio access network (RAN) node, and then the radio access network (RAN) node providing the new or updated parameters to the wireless terminal when the wireless terminal transitions from connected mode to idle mode.

In other example embodiments the toggle inhibitor is configured to curtail the toggling by signaling a priority list of radio access technologies to the wireless terminal.

In other example embodiments the toggle inhibitor is configured to temporarily reconfigure the parameter utilized by the wireless terminal in selecting a radio access technology.

In other example embodiments the toggle inhibitor is configured to curtail the toggling by paging the wireless terminal and bringing the wireless terminal to a connected mode.

In other example embodiments the toggle inhibitor is configured to curtail the toggling by rejecting an area update attempt by the wireless terminal.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 10 is a diagrammatic view of a first embodiment of a history list stored in a memory.

FIG. 11 is a diagrammatic view of a second embodiment of a history list stored in a memory.

DETAILED DESCRIPTION

In the following description, for purposes of explanation and not limitation, specific details are set forth such as particular architectures, interfaces, techniques, etc.

in order to provide a thorough understanding of the present invention. However, it will be apparent to those skilled in the art that the present invention may be practiced in other embodiments that depart from these specific details. That is, those skilled in the art will be able to devise various arrangements which, although not explicitly described or shown herein, embody the principles of the invention and are included within its spirit and scope. In some instances, detailed descriptions of well-known devices, circuits, and methods are omitted so as not to obscure the description of the present invention with unnecessary detail. All statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

The functions of the various elements including functional blocks labeled or described as "processors" or "controllers" may be provided through the use of dedicated hardware as well as hardware capable of executing software in association with appropriate software. When provided by a processor, the functions may be provided by a single dedicated processor, by a single shared processor, or by a plurality of individual processors, some of which may be shared or distributed. Moreover, explicit use of the term "processor" or "controller" should not be construed to refer exclusively to hardware capable of executing software, and may include, without limitation, digital signal processor (DSP) hardware, read only memory (ROM) for storing software, random access memory (RAM), and non-volatile storage.

Figure 1:
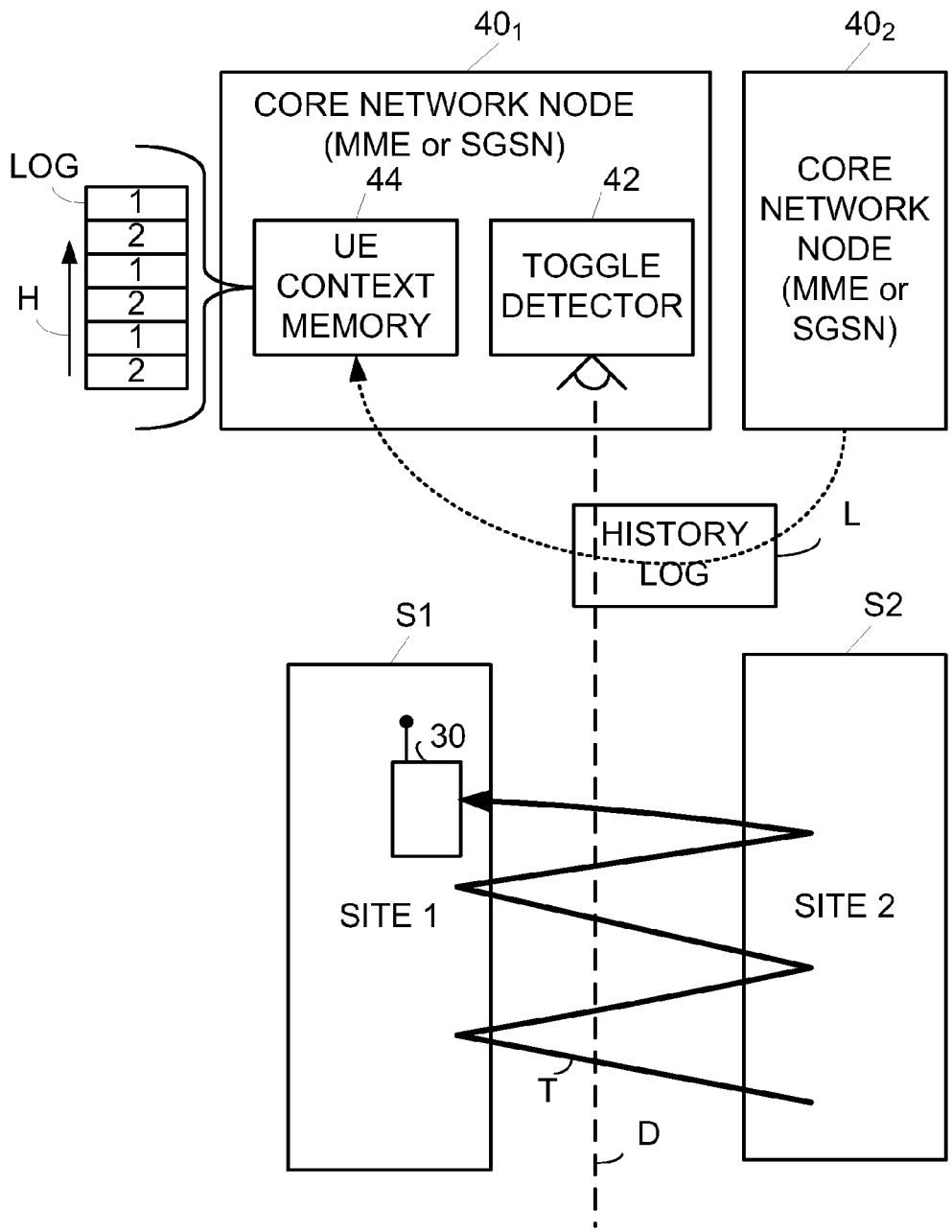
FIG. 1 is a diagrammatic view showing detection by a core network node of a generic toggling scenario wherein a wireless terminal toggles between two sites.

FIG. 1 shows a wireless terminal (WT) 30 that has been travelling back and forth between two sites, e.g., between a first site S1 (site 1) and a second site S2 (site 2). As will become more apparent subsequently, the sites S1 and S2 can represent various different phenomena or locations, such as differing radio access technologies (see, e.g., FIG. 6), different location areas (see FIG. 7), or differing core network nodes (see FIG. 8), as non-exhaustive examples. The path of wireless terminal 30 as it has travelled back and forth between site S1 and site S2 is depicted by jagged arrow T. In switching back and forth between site S1 and site S2 in its path of travel T, it can be conceptualized that the wireless terminal 30 has repetitively crossed a delineator depicted by broken line D. The delineator D can be any criteria, circumstance, or phenomena which causes or prompts a change or handover from one site to another. As such, the delineator D can represent (but is not limited to) a geographic boundary or effective service range, for example.

FIG. 1 and other figures show that site S1 and site S2 are associated with respective core network nodes $40_1$ and $40_2$. Depending on the type of radio access network (RAN) which characterizes the sites, the core network nodes $40_1$ and $40_2$ can be or comprise, for example, a Serving GPRS Support Node (SGSN) node or a Mobility Management Entity (MME). Typically a SGSN serves as the core network node for a site which utilizes UTRAN and/or GERAN, while a MME serves as the core network node for a site which utilizes EUTRAN.

As shown by core network node $40_1$, in an example embodiment one or both/more core network nodes comprise toggle detector 42 and UE context memory 44. The toggle detector 42 determines whether wireless terminal 30 is in a toggling scenario. In an example embodiment, the toggle detector 42 ascertains whether or not wireless terminal 30 is in a toggling scenario by using history information concerning the wireless terminal 30, and particularly history information which comprises a log L of area updates requested for/by wireless terminal 30. In the drawings, log L is also referred to as "LOG". Log L is maintained and updated as appropriate by the network core networks which serve the sites to which wireless terminal 30 travels. Accordingly, FIG.

1 shows log L being transferred from core network node 44₂ to core network node 44₁ in conjunction with a most recent handover of wireless terminal 30 from site S2 to site S1, culminating in storage of log L in UE context memory 44.

Yet further, FIG. 1 shows (in simplified, example form) the contents of log L upon receipt by core network node 40₁ and storage in UE context memory 44. The example, simplified contents of log L include a recent history of visitation and consequent area updates beginning with site S2, followed by area updates/visits to site S1, site S2, site S1, site S2, and most recently to site S1. For the simplified example of FIG. 1, arrow H shows the direction of historical development of the contents of log L, thereby indicating that (for this particular, non-limiting example) the log L is complied beginning with the earlier visited sites stored at bottom locations of log L and more recent sites being stored in more recent or higher locations of log L. The log L thus can be conceptualized as a traveling window of visited site information, the window including a predetermined number of most recently visited sites, with the most recently visited site being located at the top of the stack of log L. Moreover, in as much as each visited site requires a new area update, log L also represents a history of area updates requested for the wireless terminal.

Figure 2:
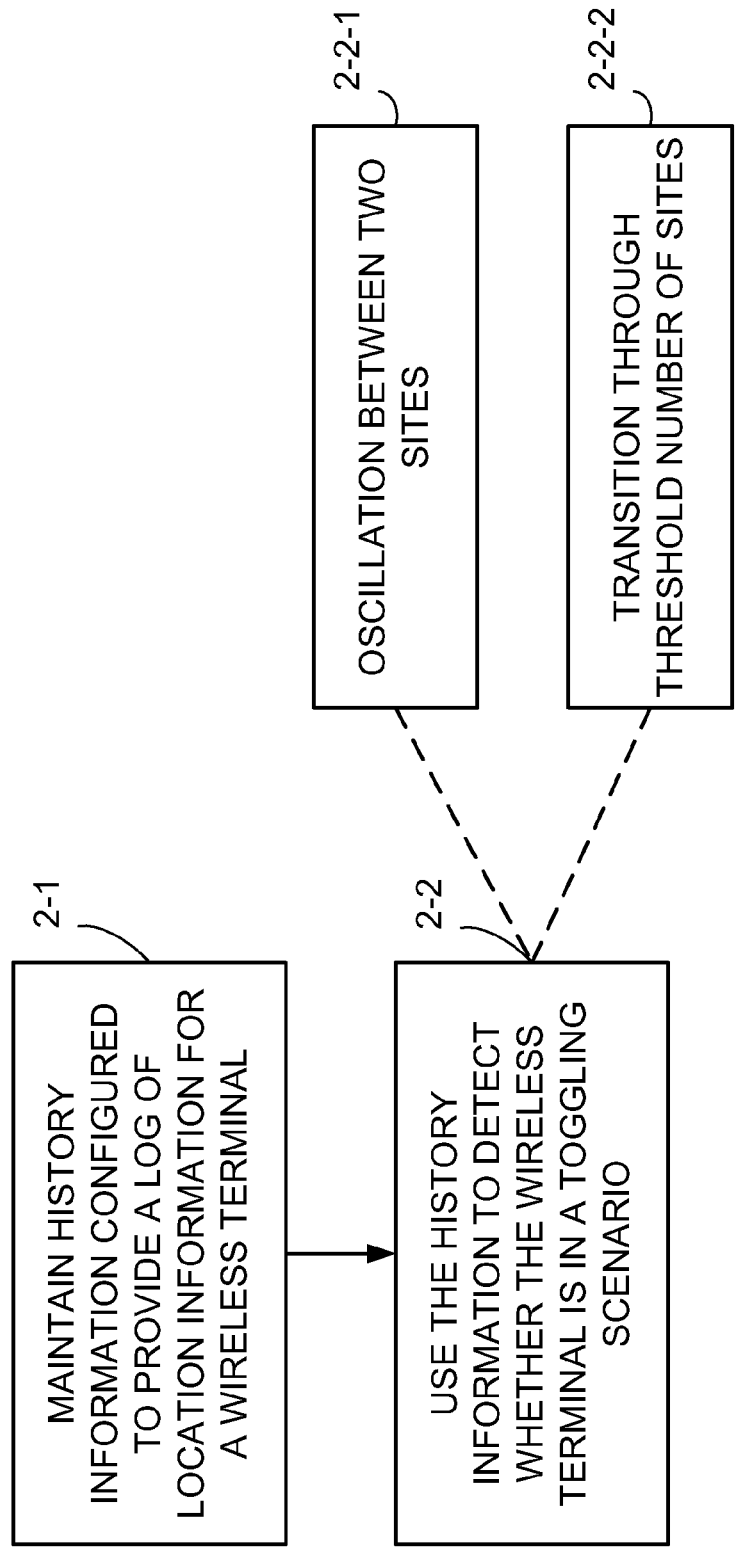
FIG. 2 is a flowchart showing basic acts or steps involved in a method of detecting a toggling scenario.

FIG. 2 illustrates basic, example steps or acts performed by a core network node which detects a toggling scenario of a wireless terminal such as wireless terminal 30. Act 2-1 of FIG. 2 comprises maintaining, in the core network node (e.g., in UE context memory 44), history information configured to provide the log L of location information. Act 2-2 comprises using the history information (stored in log L) to determine whether the wireless terminal is in a location update toggling scenario, e.g., a toggling scenario in which location update procedures are performed too often. By "too often" is meant that either a number or rate of performances of a location update procedure involving a set of locations exceeds a prescribed number (e.g., a prescribed limit). Such prescribed or predetermined number can be input or stored in any suitable manner, and can be pre-determined or adaptively determined taking into consideration relevant factors.

As further illustrated by FIG. 2, there are several ways of using the history information to determine whether the wireless terminal is in a toggling scenario. In other words, there are several ways of performing act 2-2. A first way of performing act 2-2 is represented by sub-act 2-2-1, and comprises using the history information to determine whether the wireless terminal is in a toggling scenario between plural sites, e.g., between two radio access networks of differing radio access technologies. This detection of sub-act 2-2-1 is indeed what is depicted in the situation of FIG. 1, wherein wireless terminal 30 is in a toggling scenario which involves bouncing back and forth between site S1 and site S2.

Figure 3:
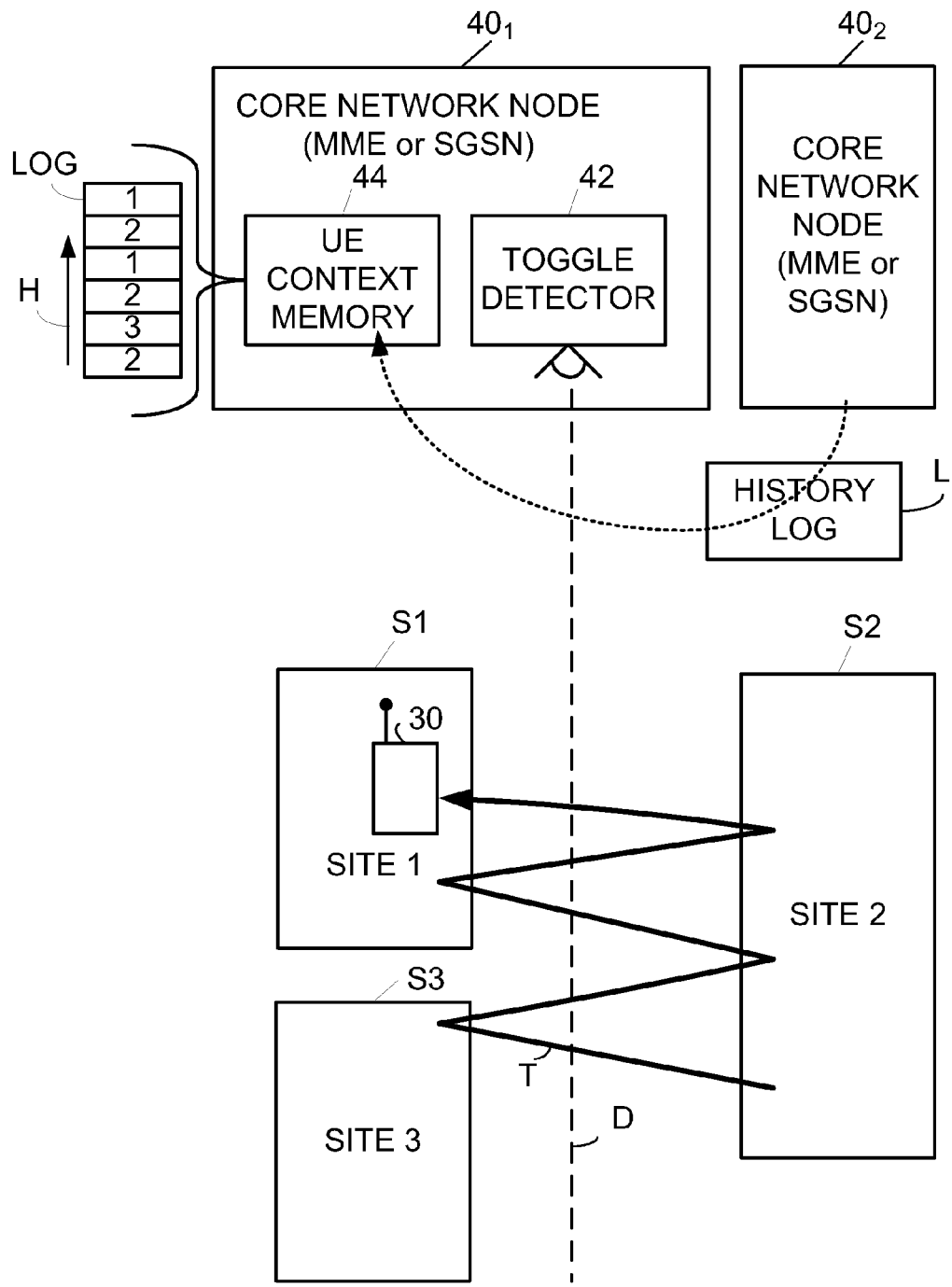
FIG. 3 is a diagrammatic view showing detection by a core network node of a generic toggling scenario wherein a wireless terminal toggles through more than a predetermined number of sites.

A second way of performing act 2-2 is represented by sub-act 2-2-2, and comprises using the history information to determine whether the wireless terminal has transitioned through more than a threshold number of networks of sites (e.g., through more than a threshold number of differing radio access technologies). A basic situation reflective of sub-act 2-2-2 is illustrated in FIG. 3. In the FIG. 3 situation, wireless terminal 30 has travelled most recently from site S2 to site S3, from site S3 back to site S2, from site S2 to site S1, from site S1 to site S2, and then back to site S1.

Figure 4:
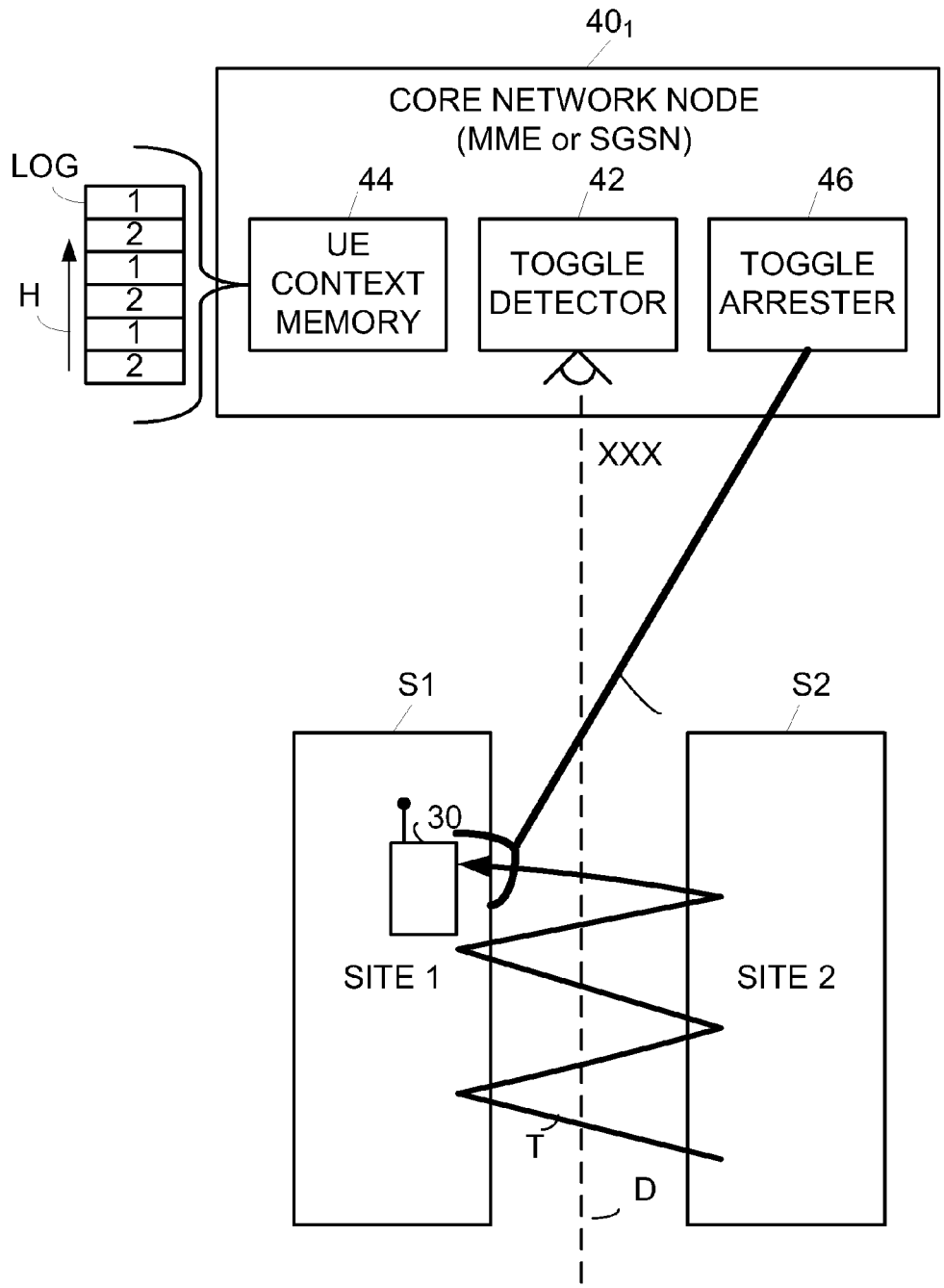
FIG. 4 is a diagrammatic view showing detection and arresting by a core network node of a generic toggling scenario.
Figure 5:
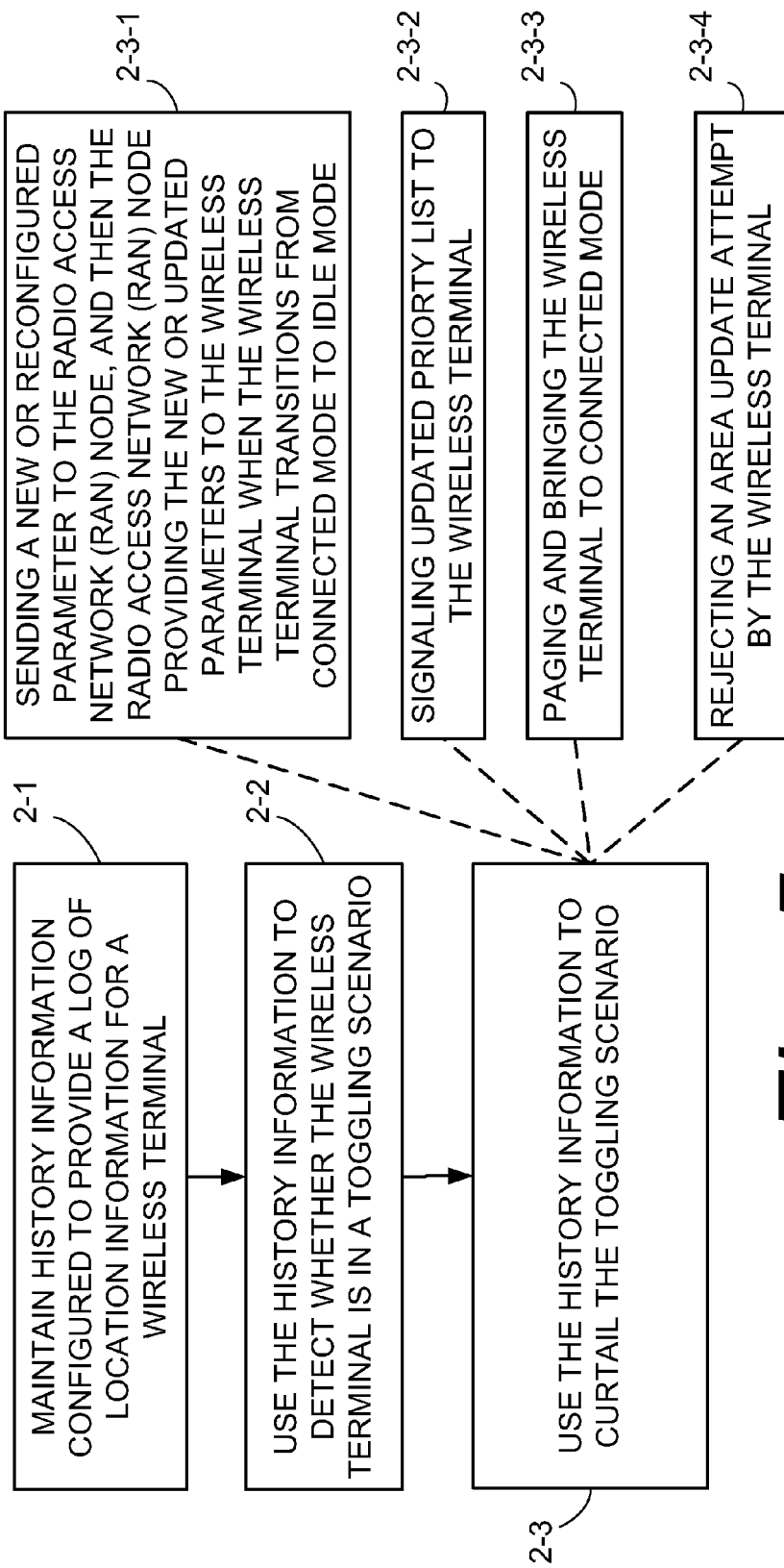
FIG. 5 is a flowchart showing basic acts or steps involved in a method of detecting and arresting a toggling scenario.

FIG. 4 and FIG. 5 illustrate an optional augmentation of the embodiment and mode of FIG. 1 and FIG. 2. In FIG. 4 and FIG. 5, as in certain other figures discussed herein, elements and acts which have essentially the same structure and/or function as those already described with reference to FIG. 1 and FIG. 2 are similarly referenced. FIG. 4 particularly shows that the core network node 40₁ further comprises toggle arrester 46. Provision of toggle arrester 46 enables core network node 44₁ to use the history information to arrest, curtail, inhibit, or stop the toggling scenario. Accordingly, FIG. 5, which illustrates an example method which can be performed by core network node 44₁, includes an additional act 2-3. Act 2-3 comprises using the history information to curtail or stop the toggling scenario.

Curtailment of the toggling scenario can occur in various ways. FIG. 5 shows in sub-acts 2-3-1 through 2-some example ways of curtailing toggling. Some of the curtailment techniques particularly pertain to situations in which the toggling occurs between sites which are networks having differing radio access technology (see FIG. 6), and such curtailment involves reconfiguring a parameter utilized by the wireless terminal in selecting a radio access technology. For example, sub-act 2-3-1 curtails the toggling scenario by sending a new or reconfigured parameter to the radio access network (RAN) node, and then the radio access network (RAN) node providing the new or updated parameters to the wireless terminal when the wireless terminal transitions from connected mode to idle mode.

Another example implementation of this toggling curtailment, represented by sub-act 2-3-2, comprises signaling an updated priority list of radio access technologies to the wireless terminal to be used for RAT selection. This can be by utilizing the RAT priority lists and parameters as defined in TS 36.304, incorporated herein by reference.

Sub-act 2-3-3 depicts another example mode of curtailing the toggling which comprises paging the wireless terminal and bringing the wireless terminal to a connected mode.

Sub-act 2-3-4 depicts yet another example mode of curtailing the toggling which comprises rejecting an area update attempt by the wireless terminal.

Some variations of the toggling curtailment modes, discussed subsequently, comprise implementing actions which are directed to overcoming or curtailing the toggling scenario, but which are only temporary in nature.

Figure 6:
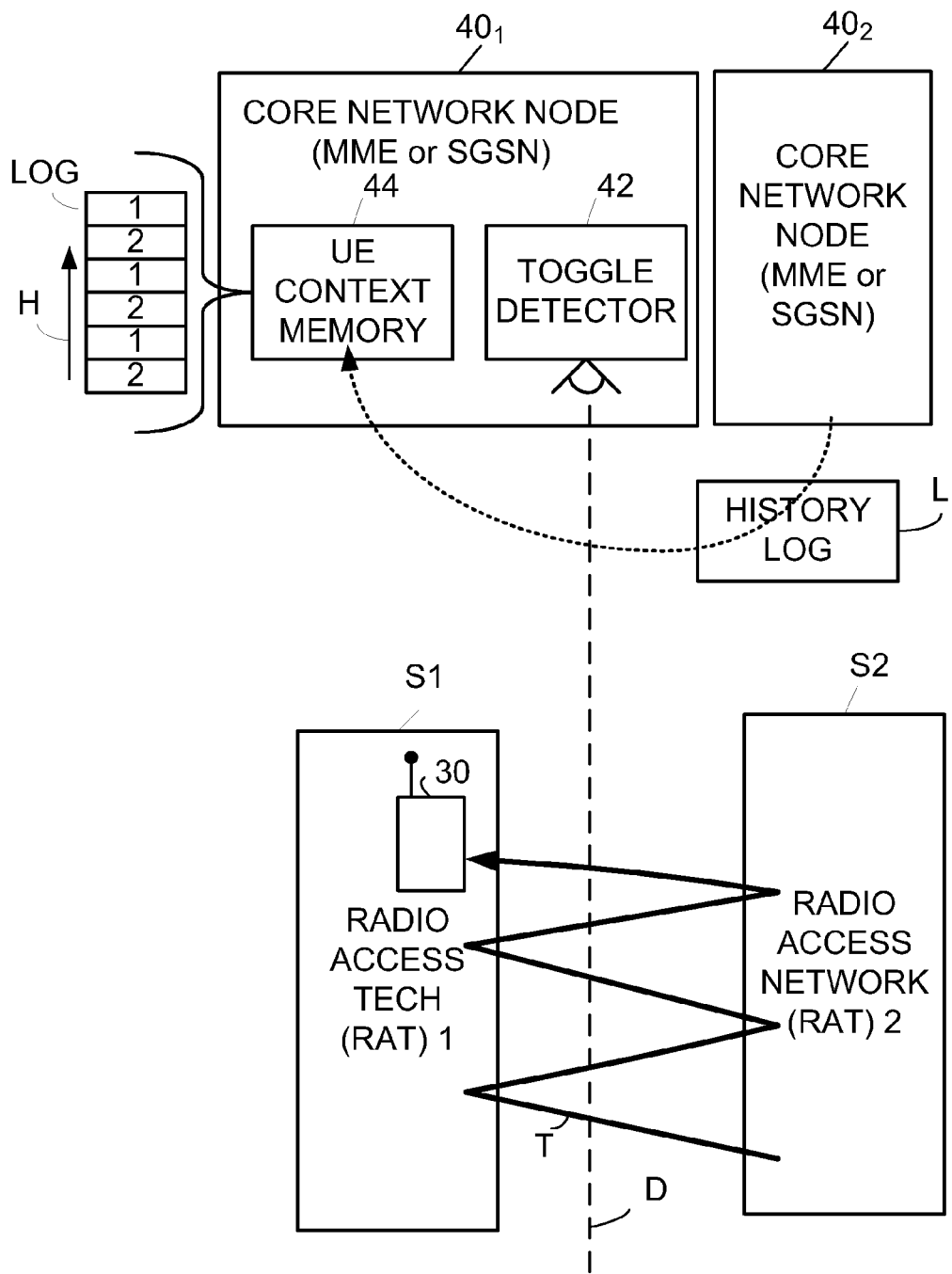
FIG. 6 is a diagrammatic view showing detection by a core network node of a toggling scenario wherein a wireless terminal toggles between two radio access technologies (RATs).
Figure 7:
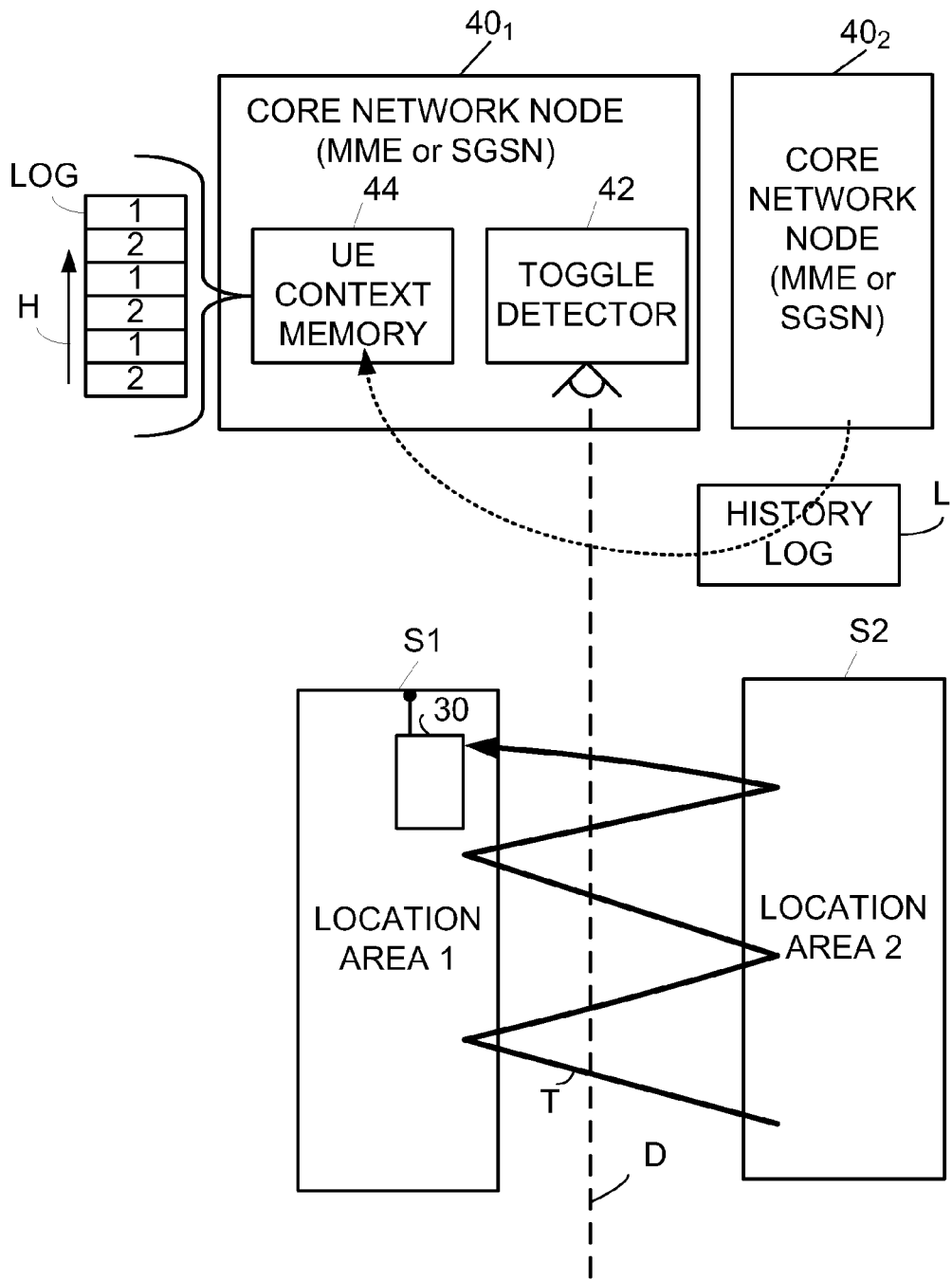
FIG. 7 is a diagrammatic view showing detection by a core network node of a toggling scenario wherein a wireless terminal toggles between two location areas.
Figure 8:
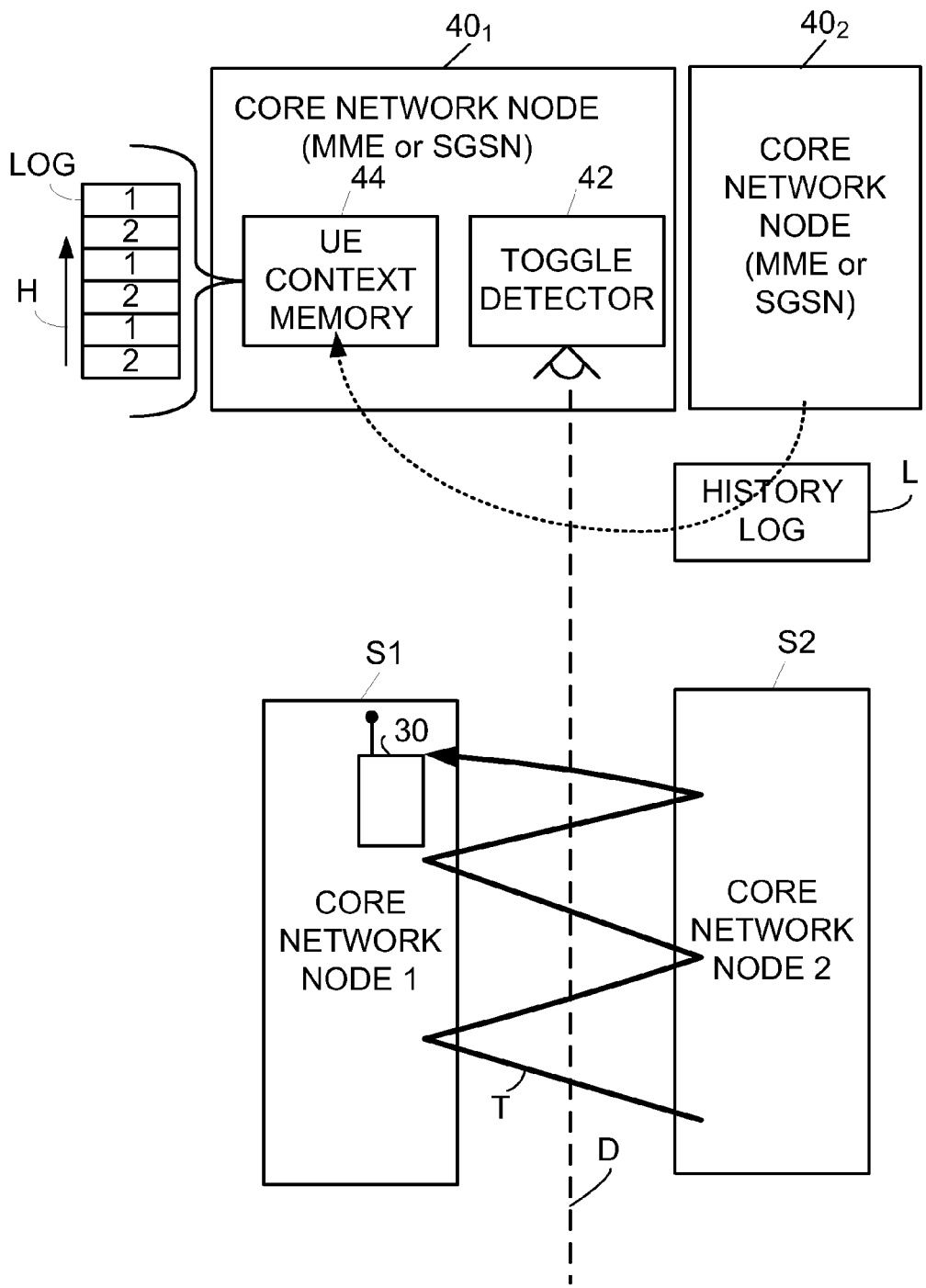
FIG. 8 is a diagrammatic view showing detection by a core network node of a toggling scenario wherein a wireless terminal toggles between two core network nodes.

As stated previously, FIG. 1-FIG. 5 generally refer to generic situations and modes in which site 51 and site S2 can represent any appropriate jurisdiction or situation into which entry by wireless terminal requires or invites a location update. Other figures depict non-exhaustive example embodiments in which site S1 and site S2 can assume more specific roles and functions. For example, FIG. 6 illustrates an embodiment and mode which comprises using the history information to determine whether the wireless terminal is toggling between plural radio access networks of differing radio access technologies. FIG. 7 illustrates an embodiment and mode which comprises using the history information to determine whether the wireless terminal is toggling between a first location area and a second location area (the first location area and the second location area each requiring separate location update procedures). FIG. 8 illustrates an embodiment and mode which comprises using the history information to determine whether the wireless terminal is toggling between a first core network node and a second core network node.

It should be understood that the acts of FIG. 2 and FIG. 3, including the optional toggling curtailment act, as well as other aspects of the technology disclosed herein, can be applicable as appropriate to each of the site examples of FIG. 6-FIG. 8 as well as to other non-illustrated examples.

Figure 9:
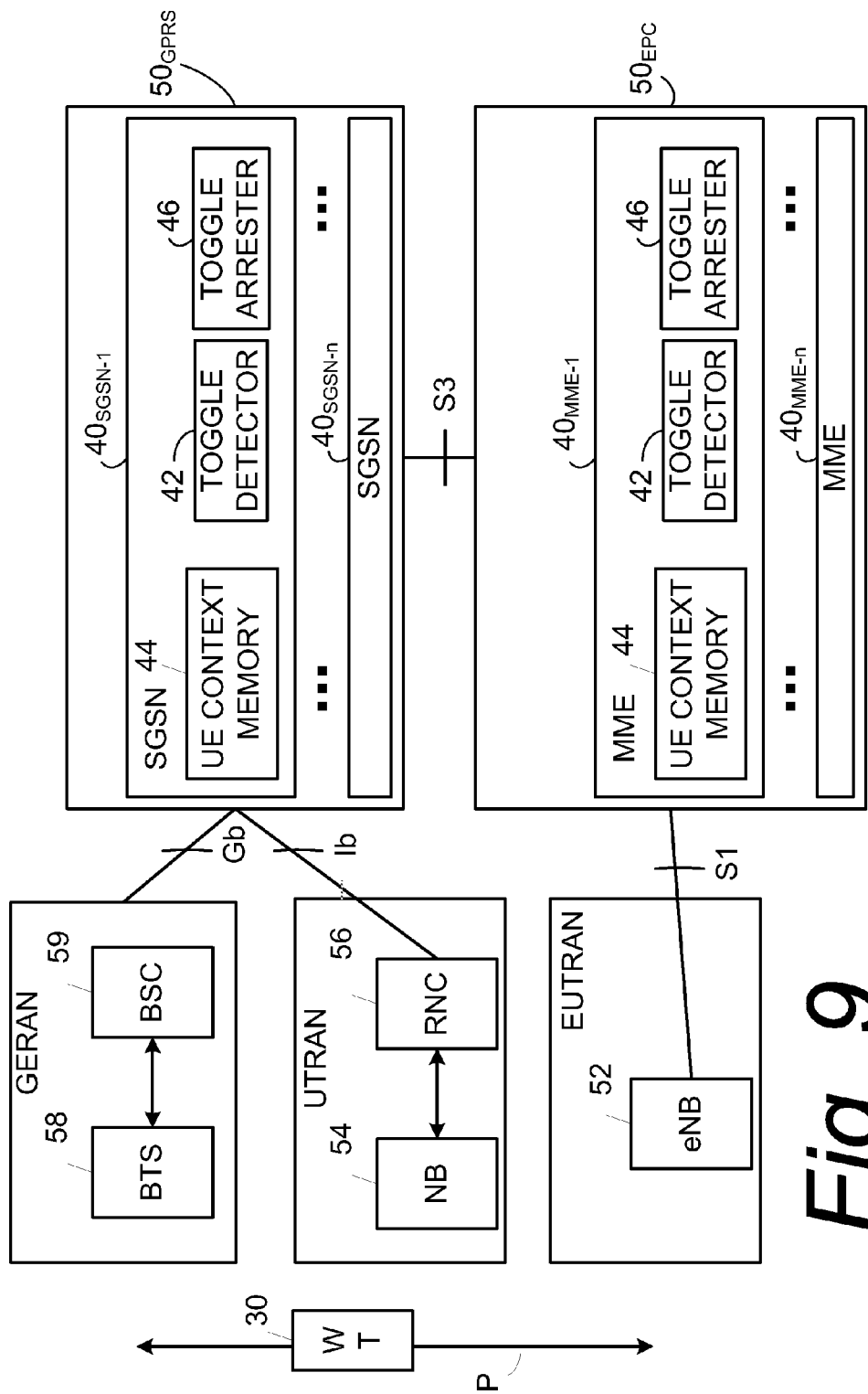
FIG. 9 is a schematic view of a telecommunications system comprising radio access networks of differing radio access technologies and corresponding core networks.

FIG. 9 illustrates in broader context an example environment in which embodiments of the technology disclosed herein can operate. FIG. 9 shows by arrow P that wireless terminal 30 can travel so as to request or require location updates in several radio access networks, such as a GERAN network, a UTRAN network, and an EUTRAN network. The GERAN network and the UTRAN network are associated over their respective Gb and Ib interfaces with a GPRS core network $50_{GPRS}$, while the EUTRAN network is associated over the S1 interface with an evolved packet core network $50_{EPC}$.

As understood by the person skilled in the art, the UTRAN network comprises one or more base stations or NodeBs (nB), one of which (NodeB 52) is shown for simplicity in FIG. 9. The NodeB 52 is controlled by a radio network control node (RNC) 54. The EUTRAN, on the other hand, is an essentially flat network in which an evolved node B (eNodeB 56) performs many functions of the radio network controller, so that the eNodeB 56 reports directly to evolved packet core network $50_{EPC}$ over the S1 interface. The GERAN architecture includes one or more base station transceivers, such as base station transceiver (BTS) 58, which is controlled by a base station controller (BSC) 59.

The GPRS core network $50_{GPRS}$ comprises, e.g., one or more Serving GPRS Support Node (SGSN) 60, which serve both the UTRAN and GERAN. FIG. 9 particularly shows GPRS core network $50_{GPRS}$ as comprising Serving GPRS Support Node (SGSN) $40_{SGSN-1}$ through Serving GPRS Support Node (SGSN) $40_{SGSN-n}$. Consistent with the foregoing explanation of toggling scenario detection, each Serving GPRS Support Node (SGSN) $40_{SGSN}$ can comprise toggle detector 42, UE context memory 44, and (optionally) toggle arrester 46.

Similarly, the evolved packet core network $50_{EPC}$ (which serves the EUTRAN) comprises, e.g., one or more Mobility Management Entities (MMEs) such as Mobility Management Entity (MME) $40_{MME-1}$ through Mobility Management Entity (MME) $40_{MME-n}$. Again consistent with the foregoing explanation of toggling scenario detection, each of the Mobility Management Entities (MMEs) $40_{MME}$ can comprise toggle detector 42, UE context memory 44, and (optionally) toggle arrester 46.

Various functions of the core network nodes, including toggle detector 42, UE context memory 44, and toggle arrester 46, and can be performed by one or more controllers or processors, as those terms are expansively elaborated herein.

One example aspect of the technology disclosed herein comprises maintaining the history information in a UE context for the wireless terminal (e.g., in UE context memory 44), and in the form of a log such as log L. The history or log could alternatively be stored in another entity of the core network node 40. In an example implementation, the history information serves as a log of sites visited by a wireless terminal, and thus a log of requested location updates.

FIG. 10 shows an example format of a representative, generic log L(10), from which it is understood that maintaining the history information comprises configuring the history information so that the log L(10) comprises an integer N number of records 64 (each row of the table of FIG. 10(10) is conceptualized as corresponding to a record). Each record of log L(10) comprises plural fields, with each row of the table corresponding to a different field. A record such as record 64 *j* includes a site identifier field and a time field. The site identifier field serves to indicate a site involved in area update *j*. The time field is configured to facilitate a determination of an amount of time the wireless terminal has spent in the site identified for the record *j*.

In one example embodiment shown in FIG. 11, the site type field is a radio access technology type field, as is understood with reference to the embodiment of FIG. 6 wherein site S1 is a first radio access technology type and site S2 is a second radio access technology type. Whatever be the site type field (whether radio access technology type or otherwise), it should be understood from FIG. 11 that, in separate or potentially combined implementations, a log such as log L(11) can also have other fields to provide information regarding other types of site classification. For example, to reflect the technology of FIG. 7, log L(11) can include an area location field which identifies an area update identifier utilized by the wireless terminal in the site (e.g., the radio access technology network of the same record). Alternatively or additionally, to reflect the technology of FIG. 7, log L(11) can include a node field which identifies a core network node involved in the area update of the same record. Thus, it should be understood that the history log can comprise fields corresponding to any suitable site type descriptor, or combinations thereof.

Thus, as described above, as an aid for avoidance of toggling between sites (e.g., between radio access technologies [RATs] in one example embodiment), the toggle detector 42 (implementing a detection scheme) in the MME/SGSN nodes 40 is used to detect toggling between GERAN/UTRAN and EUTRAN. This detection scheme is realized by maintaining limited history information about the last used sites (e.g., RATs) as stored in the UE context of the MME and SGSN (e.g., in UE context memory 44). In this way a core network node 40 such as a MME or a SGSN node can easily detect excessive access changes between GERAN/UTRAN and EUTRAN. Moreover, as soon as excessive toggling between accesses is detected, the site selection priorities for the specific wireless terminal can be modified.

As mentioned previously, the technology disclosed herein is particularly applicable to detection of a toggling scenario in involving handover between different radio access technologies (RATs). In connected mode, handover between RATs is network controlled. By setting appropriate thresholds and priorities for triggering inter-RAT handover in connected mode, the toggling between accesses is avoided. Hence bringing a UE such as wireless terminal 30 to connected mode is yet another way to avoid toggling between accesses.

The technology disclosed herein comprises, e.g., two basic parts or aspects: (1) detection of toggling between sites (e.g., RATs), as depicted by the acts of FIG. 2, and (2) avoiding toggling between sites (e.g., RATs), as depicted by the act 2-3 of FIG. 5. These two parts can be used independently, e.g., means for avoiding toggling between sites (e.g., RATs) are possible to use even without detection means.

In conjunction with detection of a toggling scenario, the UE context 44 in the MME/SGSN 40 is extended to include the history information mentioned previously in conjunction with log L. For an embodiment involving radio access technologies (RATs) as the monitored sites, each MME/SGSN 40 adds information such as the following information to the top of the history list:

Site type (e.g., RAT type, such as e.g., GERAN, UTRAN or EUTRAN).

Time: Time elapsed.

These types of information are understood with reference to the log L(10) of FIG. 10. Multiple options are possible for time measurement, e.g., for the time field of the log L(10). For example, the time field may refer to the time spent in a given MME/SGSN. In this case each new MME/SGSN adds a new element to the history list. Or alternatively the time field can refer to the time spent in a given RAT type. In that case a new MME/SGSN adds a new element to the history list only if the RAT type has changed. Time is measured only when the wireless terminal is Attached (registered) in the network. Other time measures are also possible, such as the time when the wireless terminal arrived and/or when the wireless terminal left the MME/SGSN. Or as another alternative, the time when the wireless terminal was last active in the MME/SGSN can also be supplied.

As understood from the fields of log L(11) of FIG. 11, optionally the following information may also be included in the history list:
- Identity of the MME/SGSN (e.g., domain name or IP address). This information can be used to detect a wireless terminal toggling between different MME/SGSN nodes, even if the wireless terminal stays in the same radio access technology.
- UE Location information (e.g., Tracking/Routing Area, Cell id.). This information can be used to detect a UE toggling between different Tracking/Routing areas.
- Additional information related to the Mobility or Activity of the UE (e.g. last time it was active, a cumulative activity factor such as e.g. the fraction of time while the UE was in connected state, number of Tracking Area Updates).

Whenever the wireless terminal changes from an old MME/SGSN to a new MME/SGSN, the old MME/SGSN supplies a list of the N most recent elements of the history list, where the topmost element in the history list corresponds to the wireless terminal's presence in the old MME/SGSN. A possible example value of N can be four. The MME/SGSN measures the amount of time spent while the UE context was in the node, and supplies this information in the time field of the most recent element in the history list. The MME/SGSN may supply the last RAT type and the amount of time the wireless terminal spent in the MME/SGSN. Or alternatively if the MME/SGSN was changed without RAT change, the MME/SGSN may add the time spent in the MME/SGSN to the time field of the latest element in the history list.

If the MME and SGSN functionality is implemented in the same node, the history list is still updated at each RAT change, so that the history list can be used to detect toggling between radio access technologies (RATs). In other words, the node can be regarded as comprising a logically separate MME and SGSN within a single physical node.

What follows below are some example explicit criterion for detecting a toggling scenario. For notation convenience in the ensuing examples, the most recent history information element is referred to as History(1), the second most recent is referred to as History (2), and so forth. The current values RAT type, MME/SGSN identity and UE location information can be referred to as being part of History (0). A specific value in the history table can be referred to as History(i, RAT type), History(i, Time), History(i, MME/SGSN id), History(i, UE location). The example criterion are as follows:

1. History(0, RAT type) does not equal History(1, RAT type) AND History(0, RAT type)=History(2, RAT type)=...=History(2*i, RAT type) for all 2*i<=N, AND History(1, RAT type)=History(3, RAT type)=...=History(2*i+1, RAT type) for all 2*i+1<=N.
   In other words, the UE is detected toggling between two different radio access technologies (RATs), in the manner illustrated in FIG. 1.
2. As an alternative to 1, the number of RAT changes (History(I, RAT type) is not equal to History(i+1, RAT type), i<N) is higher than a threshold, as illustrated in FIG. 3.
3. In addition to 1, the toggling is detected between two specific UE locations (e.g., between a given RA and a given TA):
   History(0, UE location)=History(2, UE location)=...=History(2*i, UE location) for all 2*i<=N, AND Histo UE location)=History(3, UE location)=...=History(2*i+1, UE location) for all 2*i+1<=N.
4. Any of the above criteria can be limited to only those elements in the history list which the UE has visited in the last T period of time. I.e., consider only the elements i where History(0, Time)+History(1, Time)+...+History(i, Time)<=T.
5. Other criteria are also possible. (E.g., toggling between different MME/SGSN nodes can be detected by changes in the MME/SGSN node identity, even if the RAT type has not changed.)

The criterion provided above can apply regardless of whether the wireless terminal is in idle or connected mode. In other words, the above criteria can detect also when the wireless terminal is toggling in connected mode.

Once toggling has been detected, as described above (see the example embodiment and mode of FIG. 4 and FIG. 5), or by any other suitable means, the measures can be employed to help reduce the toggling and thus the amount of inter-site (e.g., inter-RAT mobility) signaling.

As mentioned above, an optional aspect of the technology disclosed herein is curtailment of the toggling scenario, as depicted by act 2-3 of FIG. 5, after toggling has been detected. In other words, once toggling has been detected, and as described above (see the example embodiment and mode of FIG. 4 and FIG. 5), or by any other suitable means, the measures can be employed to help reduce the toggling and thus the amount of inter-site (e.g., inter-RAT mobility) signaling.

As understood, e.g., with reference to the sub-acts of act 2-3 of FIG. 5, such measures can include:
- Reconfiguration of the wireless terminal's RAT selection parameters.
- The operator using any means (e.g. device management) to re-configure the parameters in the wireless terminal used to select a site (e.g., a radio access technology). For example, the thresholds or measurement time intervals specified in 3GPP TS 36.304 can be changed.
- One specific means is to reconfigure the radio access technology priorities in such a way that one of the RATs can be downprioritized for a period of time. To decide which radio access technology (RAT) to down-prioritize, it is possible to use e.g., an operator pre-configured list. For example, the EUTRAN can be down-prioritized first if the UE is toggling between EUTRAN and another access; if not then UTRAN is down-prioritized. A specific radio access technology (RAT) should not be down-prioritized again if it is down-prioritized already. For example, it may happen that a specific RAT is down-prioritized for idle mode, but has a higher priority in connected leading to toggling in connected state, which is also detected. In such a situation, the RAT priorities in idle mode do not need to be changed in idle mode.
- To inform the wireless terminal about the change in the radio access technology (RAT) priorities, several possibilities can be used.
  - When the wireless terminal performs a RAU or TAU procedure, the NAS layer can be used to send radio access technology (RAT) priority information to the wireless terminal.
  - When in connected mode, the updated radio access technology (RAT) priority information is then sent to the RAN node (e.g., eNodeB or RNC or BSC). This updated priority information is delivered to the UE using RRC signaling as soon as it is released to idle mode. To bring the UE to connected mode, UE can be paged. Alternatively a temporary connected mode (such as during a TAU procedure) can also be used for this purpose.

A change in the radio access technology (RAT) priorities can either be signaled by giving the explicit radio access technology (RAT) priority list, or it can also be signaled as an index to a table pre-configured with radio access technology (RAT) priorities.

As also mentioned previously, example implementations of the curtailment operation are shown by sub-acts 2-3-1 through 2-3-4, some of which may be implemented by actions which are only temporary in nature. Thus, other example implementations of the toggle curtailment embodiments and modes further comprise temporarily reconfiguring a parameter utilized by the wireless terminal in selecting a radio access technology; and then returning the parameter to an original value. The parameter can be returned to its original value in several ways.

One example implementation of temporary reconfiguration comprises returning the parameter to an original value upon expiration of a network node timer. For example, the MME/SGSN can start a timer when the RAT priorities have changed. When that timer expires, the original RAT priorities are restored using one of the mechanisms above. Note that this requires the MME/SGSN to store the original RAT priorities.

Another example implementation of temporary reconfiguration to arrest toggling comprises returning the parameter to an original value upon expiration of a timer maintained by the wireless terminal. In other words, the UE wireless terminal is informed that the new RAT priorities are temporary. The RAT priorities are associated with a timer for the wireless terminal. The initial value for the timer may be set by the Mobility Management Entity (MME). Once the timer expires in the wireless terminal, the wireless terminal reverts to the previous or default priorities.

Yet another example implementation of temporary reconfiguration to arrest toggling comprises returning the parameter to an original value when the wireless terminal has moved away from areas involved in the toggling. For example, the MME/SGSN stores the location information where toggling has occurred, such as the TAs and RAs between which the wireless terminal toggled. When the wireless terminal indicates it has moved out of those areas, the original RAT priorities are restored.

Still another example implementation of temporary reconfiguration to arrest toggling comprises returning the parameter to an original value when the wireless terminal enters connected mode. That is, as soon as the wireless terminal returns to connected state, the original RAT priorities are restored. Note that this does not require the MME/SGSN to store the original as well as updated RAT priorities separately.

A combination of the above temporary reconfiguration techniques to arrest toggling is also possible.

Another way to terminate the toggling scenario, represented by sub-act 2-3-3 of FIG. 5, is to bring the wireless terminal to connected mode. When the network detects a UE toggling (e.g., toggling between accesses or between MME/SGSN nodes or TA/RAs), the UE can be paged and brought to connected state where mobility is network controlled, hence toggling can be avoided. It should be noted that it is possible to use the mechanisms described herein to avoid toggling in both connected and idle mode. For example, it is possible to use the same priority list in both idle mode in the UE and connected mode in the radio access network (RAN). When toggling is detected, both the radio access network (RAN) and the wireless terminal are updated to downgrade toggling for the wireless terminal.

Another way to terminate the toggling scenario, represented by sub-act 2-3-4 of FIG. 5, is for the wireless terminal to be rejected in the target access. When a wireless terminal toggles and selects a new radio access technology (RAT), the wireless terminal can receive a TAU/RAU reject indication in the target access, with an error code indicating that the target access is temporarily restricted. Such an error indication may be generated in the source MME/SGSN, and signaled at context request via the new MME/SGSN to the wireless terminal, in case the MME/SGSN has detected toggling. This approach does not require radio access technology (RAT) priorities to be maintained in the wireless terminal, but requires the wireless terminal to maintain a timer based RAT restriction. It may also be less efficient since the wireless terminal has already switched to a new RAT before it gets an error response.

In EUTRAN a tracking area (TA) list concept is applied to avoid toggling within EUTRAN. That is, the wireless terminal can be registered in a list of TAs and does not need to perform TAU (except periodic ones) as long as it is within the list of TAs. This concept can be extended for GERAN and UTRAN accesses as well. A possible way of avoiding toggling, especially suited (but not limited to) scenarios when the MME and SGSN are collocated, is described below.

The wireless terminal is assigned a list of routing areas (RAs) and tracking areas (TAs). As long as the wireless terminal remains in a RA or TA which is part of that list, the wireless terminal does not need to perform RAU/TAU signaling. Note that in this situation the MME/SGSN may not know which access the wireless terminal is currently located in, so it may need to page the wireless terminal in multiple accesses as in the current ISR solution.

Advantages of the technology disclosed herein described herein include, but are not limited to, decreasing the amount of signaling (hence reducing UE battery lifetime and increasing MME and SGSN capacity) and avoiding extra complexity as apparent in state of the art solutions.

Although the description above contains many specificities, these should not be construed as limiting the scope of the invention but as merely providing illustrations of some of the presently preferred embodiments of this invention. It will be appreciated that the scope of the present invention fully encompasses other embodiments which may become obvious to those skilled in the art, and that the scope of the present invention is accordingly not to be limited. In the appended claims reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed hereby. Moreover, it is not necessary for a device or method to address each and every problem sought to be solved by the present invention, for it to be encompassed hereby.

What is claimed is:

1. A method of operating a core network node of a communications system, comprising:
   maintaining, in the core network node, history information configured to provide a log of location information for a wireless terminal and using the history information to detect whether the wireless terminal is in a location update toggling scenario where location updates by the wireless terminal involving a set of locations exceed a prescribed limit,
   wherein the history information serves as a log of sites visited by a wireless terminal, and wherein maintaining the history information comprises configuring the history information to comprise an integer N number of records, each record comprising plural fields,
wherein record j includes a site identifier field and a time field, the site field indicating a site involved in area update j, and
wherein the time field is configured to facilitate a determination of an amount of time the wireless terminal has spent in the site identified for the record j.

2. The method of claim 1, further comprising including in the record j an location area field which identifies an area update identifier utilized by the wireless terminal in the site of the record j.

3. The method of claim 1, further comprising including in the record j a UE node field which identifies a core network node involved in the area update of the record j.

4. The method, of claim 1, wherein the toggling scenario comprises a toggling between a first radio access technology network and a second radio access technology network.

5. The method of claim 1, wherein the toggling scenario comprises the wireless terminal transitioning through more than a threshold number of networks of differing radio access technologies.

6. The method of claim 1, wherein the toggling scenario comprises the wireless terminal toggling between a first location area and a second location area.

7. The method of claim 1, wherein the toggling scenario comprises the wireless terminal toggling between a first core network node and a second core network node.

8. The method, of claim 1, further comprising using the history information to curtail the toggling scenario.

9. The method of claim 8, further comprising said curtailing the toggling scenario comprises reconfiguring a parameter utilized by the wireless terminal in selecting a site.

10. The method of claim 9, wherein said reconfiguring the parameter comprises sending the reconfigured parameter to a radio access network (RAN) node, and wherein the radio access network (RAN) node then providing the parameter to the wireless terminal when the wireless terminal transitions from connected mode to idle mode.

11. The method of claim 9, wherein said reconfiguring the parameter comprises signaling a priority list of radio access technologies to the wireless terminal.

12. The method of claim 10, further comprising:
temporarily reconfiguring the parameter utilized by the wireless terminal in selecting a radio access technology; and
then returning the parameter to an original value.

13. The method of claim 12, wherein said returning the parameter to the original value comprises returning the parameter to the original value upon expiration of a network node timer.

14. The method of claim 12, wherein said returning the parameter to the original value comprises returning the parameter to the original value upon expiration of a timer maintained by the wireless terminal.

15. The method of claim 12, wherein said returning the parameter to the original value comprises returning the parameter to the original value when the wireless terminal has moved away from areas involved in the toggling scenario.

16. The method of claim 12, wherein said returning the parameter to the original value comprises returning the parameter to the original value when the wireless terminal enters the connected mode.

17. The method of claim 8, further comprising said curtailing the toggling by paging the wireless terminal and bringing the wireless terminal to a connected mode.

18. The method of claim 8, further comprising said curtailing the toggling by rejecting an area update attempt by the wireless terminal.

19. The method of claim 1, wherein the using history information comprises detecting whether location updates during a prescribed time interval by the wireless terminal involving the set of locations exceed the prescribed limit.

20. A node of a communications network comprising one or more processors configured to use history information to determine whether a wireless terminal is in a location update toggling scenario where location updates by the wireless terminal involving a set of locations exceed a prescribed limit,
wherein the history information serves as a log of sites visited by the wireless terminal,
wherein the history information comprises an integer N number of records, each record comprising plural fields,
wherein record j includes a site identifier field and a time field, the site identifier field indicating a site involved in area update j, and
wherein the time field is configured to facilitate a determination of an amount of time the wireless terminal has spent in the site identified for the record j.

21. The node of claim 20, further comprising:
memory configured to store the history information comprising a log of area updates requested for the wireless terminal, wherein the one or more processors are further configured to use the history information to determine whether the wireless terminal is in the toggling scenario.

22. The node of claim 20, Wherein the node comprises at least one of a Mobility Management Entity (MME) and a Serving GPRS Support Node (SGSN).

23. The node of claim 20, further comprising a memory configured to store the history information, the history information comprising a log of area updates requested for the wireless terminal, and wherein the memory is configured to maintain the history information in a UE context for the wireless terminal.

24. The node of claim 20, wherein the one or more processors are further configured to use the history information to determine whether the toggle scenario involves the wireless terminal toggling between a first radio access technology network and a second radio access technology network.

25. The node of claim 20, wherein the one or more processors are further configured to use the history information to determine whether the toggle scenario involves the wireless terminal transitioning through more than a threshold number of networks of differing radio access technologies.

26. The node of claim 20, wherein the one or more processors are further configured to use the history information to determine whether the toggle scenario involves the wireless terminal toggling between a first area update location and a second area update location.

27. The node of claim 20, wherein the one or more processors are further configured to use the history information to determine whether the toggle scenario involves the wireless terminal toggling between a first core network node and a second core network node.

28. The node of claim 20, wherein the one or more processors are further configured as a toggle arrester that uses the history information to curtail the toggling scenario.

29. The node of claim 28, wherein the toggle arrester is configured to curtail the toggling scenario by:
reconfiguring a parameter utilized by the wireless terminal in selecting a radio access technology; and
sending the reconfigured parameter to the radio access network (RAN) node, wherein the radio access network (RAN) node provides the reconfigured parameter to the wireless terminal when the wireless terminal transitions from connected mode to idle mode.

30. The node of claim 28, wherein the toggle arrester is configured to curtail the toggling scenario by signaling a priority list of radio access technologies to the wireless terminal.

31. The node of claim 20, further comprising a toggle arrester configured to curtail the toggling scenario by temporarily reconfiguring a parameter utilized by the wireless terminal in selecting a radio access technology.

32. The node of claim 20, further comprising a toggle arrester configured to curtail the toggling by paging the wireless terminal and bringing the wireless terminal to a connected mode.

33. The node of claim 20, further comprising a toggle arrester configured to curtail the toggling by rejecting an area update attempt by the wireless terminal.

34. The node of claim 20, wherein the one or more processors are further configured to use the history in to detect whether location updates during a prescribed, time interval by the wireless terminal involving the set of locations exceed the prescribed limit.

* * * * *

UNITED STATES PATENT AND TRADEMARK OFFICE
CERTIFICATE OF CORRECTION

PATENT NO. : 8,761,805 B2
APPLICATION NO. : 12/922932
DATED : June 24, 2014
INVENTOR(S) : Miklos et al.

Page 1 of 1

It is certified that error appears in the above-identified patent and that said Letters Patent is hereby corrected as shown below:

On the Title Page, Item (75), under "Inventors", in Column 1, Line 1, delete "Pillsborosjenö" and insert -- Pilisborosjenö --, therefor.

On Title Page 2, Item (56), under "OTHER PUBLICATIONS", in Column 2, Line 3, delete "Contre," and insert -- Centre --, therefor.

In the Drawings

In Fig. 3, Sheet 3 of 11, delete " 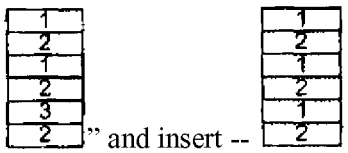 " and insert -- 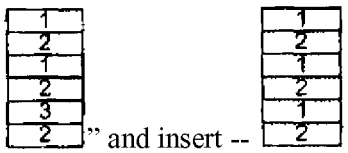 --, therefor.

In the Specification

In Column 4, Line 14, delete "Idling" and insert -- Idle --, therefor.

In Column 7, Lines 52-53, delete "etc.    in order" and insert -- etc. in order --, therefor.

In Column 10, Line 40, delete "51" and insert -- S1 --, therefor.

Signed and Sealed this
Third Day of March, 2015

Michelle K. Lee
*Deputy Director of the United States Patent and Trademark Office*